(No Model.) 5 Sheets—Sheet 2.
M. C. CHAPMAN.
WIND ENGINE.
No. 447,066. Patented Feb. 24, 1891.
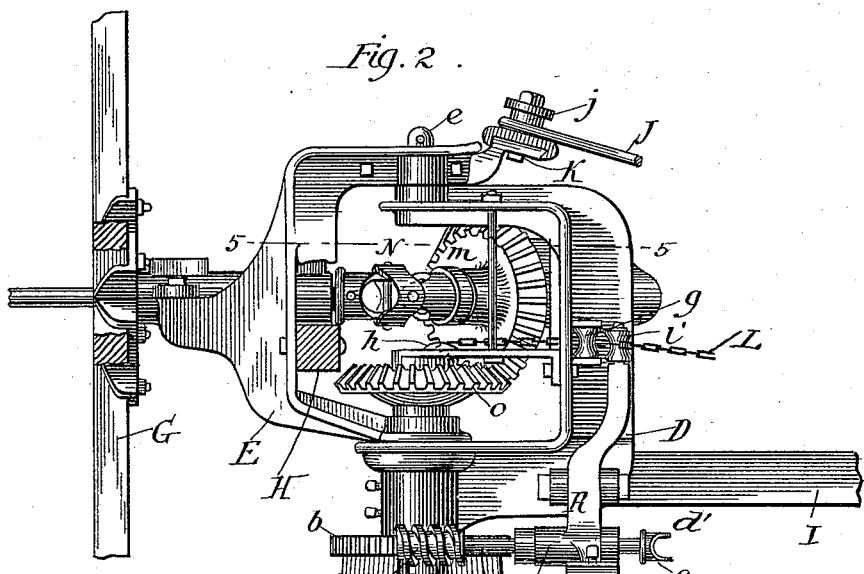
Fig. 2.
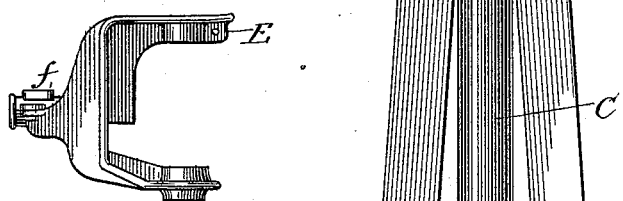
Fig. 3.
Fig. 4.
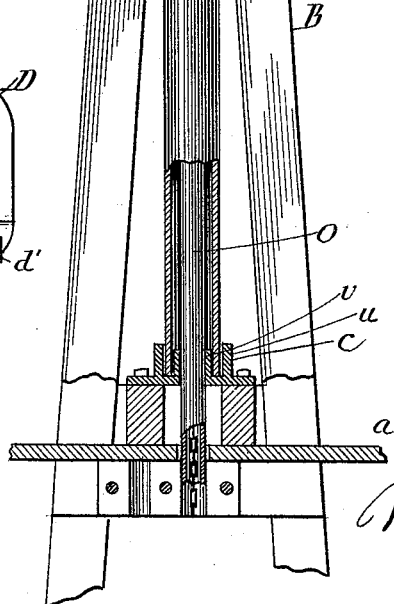
Witnesses:
Inventor:
Mark C Chapman (No Model.) M. C. CHAPMAN. 5 Sheets—Sheet 3.
WIND ENGINE.
No. 447,066. Patented Feb. 24, 1891.
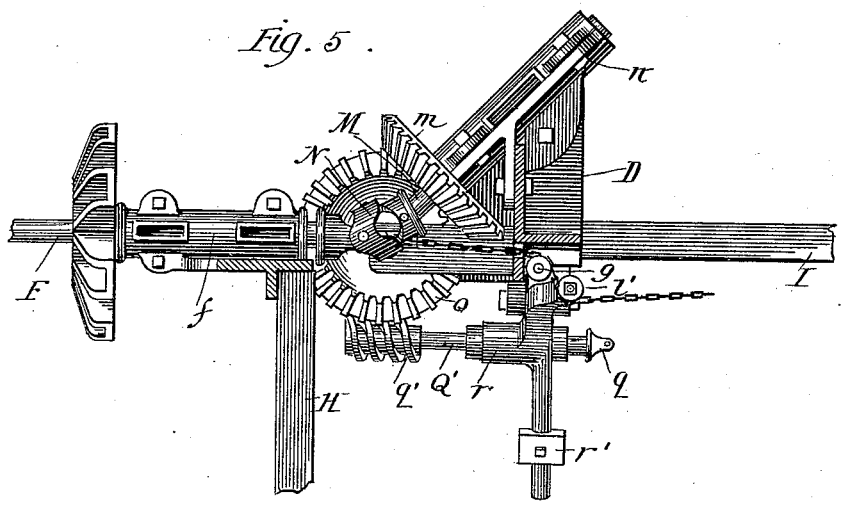
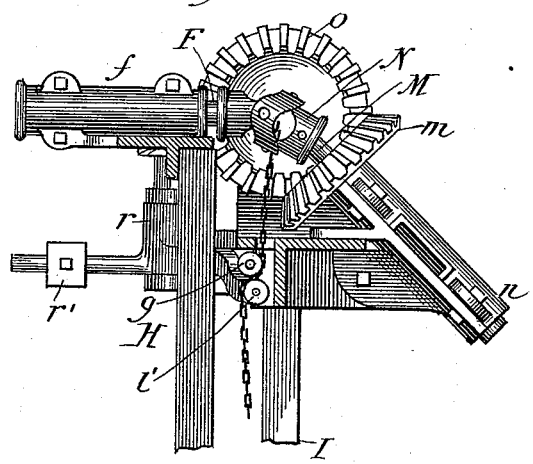
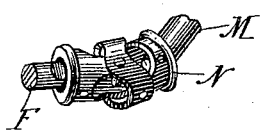

(No Model.) 5 Sheets—Sheet 4.
M. C. CHAPMAN.
WIND ENGINE.
No. 447,066. Patented Feb. 24, 1891.
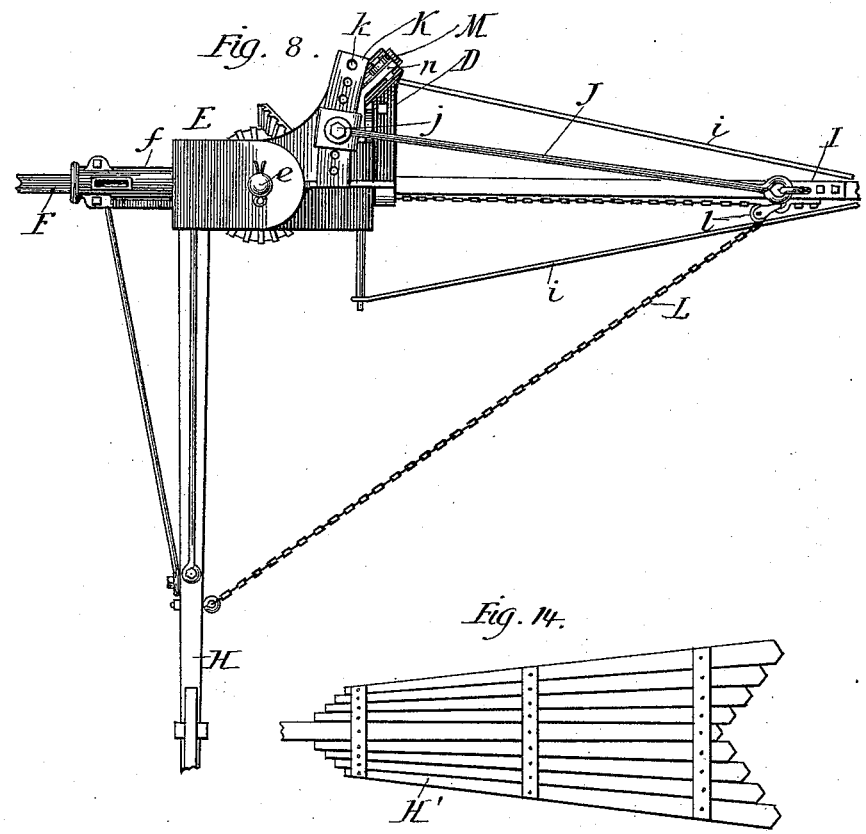
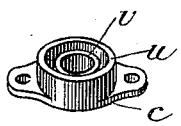
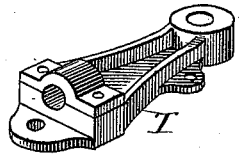
Witnesses:
Inventor:
Mark C. Chapman (No Model.) 5 Sheets—Sheet 5.

M. C. CHAPMAN.
WIND ENGINE.

No. 447,066. Patented Feb. 24, 1891.

Witnesses:

Inventor:
Mark C. Chapman

UNITED STATES PATENT OFFICE.

MARK C. CHAPMAN, OF AURORA, ILLINOIS, ASSIGNOR TO HIMSELF AND MATTHEW T. CHAPMAN, OF SAME PLACE.

WIND-ENGINE.

SPECIFICATION forming part of Letters Patent No. 417,066, dated February 24, 1891.

Application filed January 5, 1889. Serial No. 295,594. (No model.)

*To all whom it may concern:*

Be it known that I, MARK C. CHAPMAN, residing at Aurora, in the county of Kane and State of Illinois, and a citizen of the United States, have invented a new and useful Improvement in Wind-Engines, of which the following is a specification, reference being had to the accompanying drawings, in which—

Figure 1:
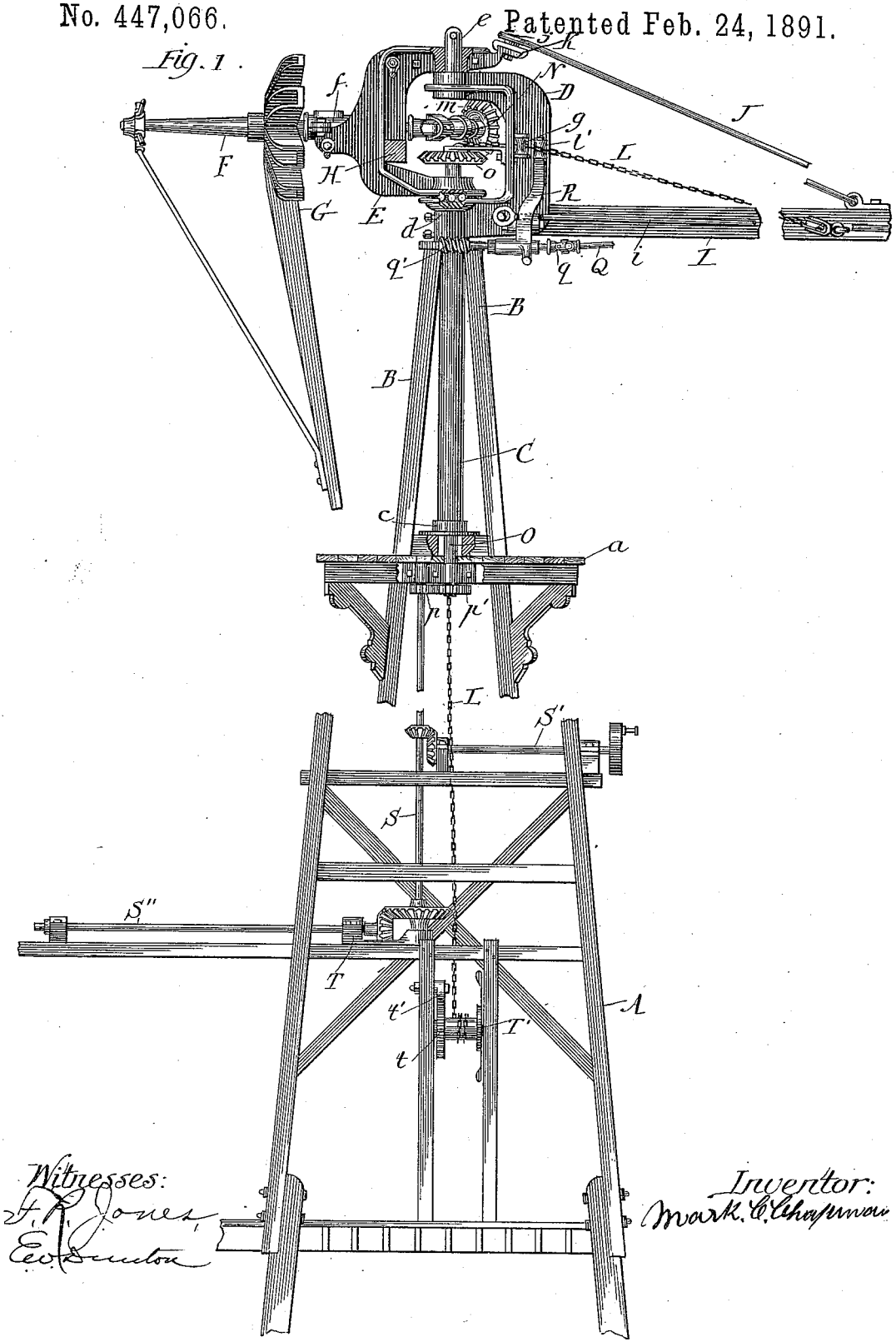
Figure 11:
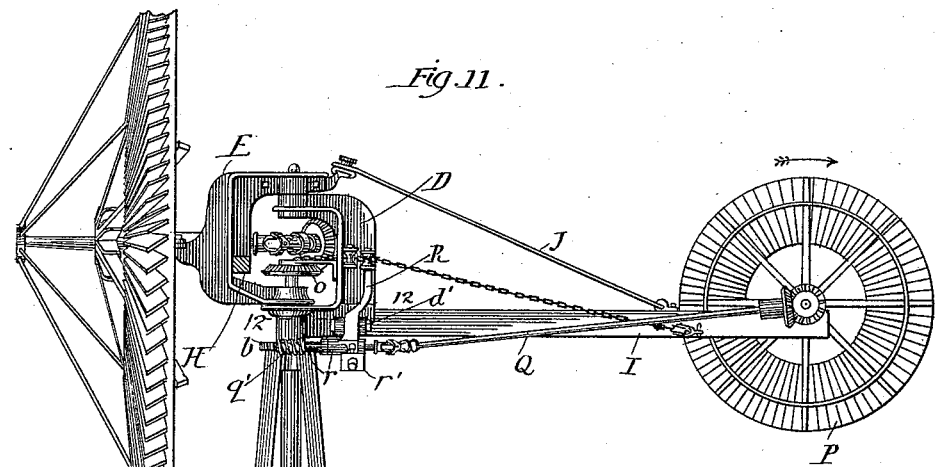
Figure 15:
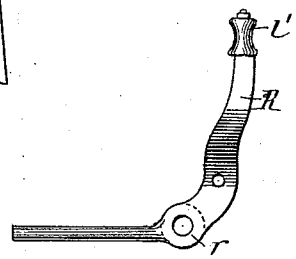
Figure 12:
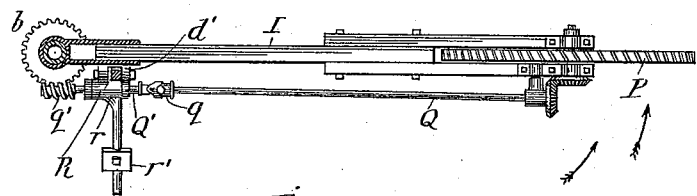
Figure 13:
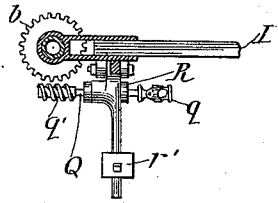

Figure 1 is a side elevation, the derrick being in section. Fig. 2 is an enlarged detail, being a side elevation of the gearing and the supporting-brackets. Fig. 3 is a detail, being a side elevation of the bracket for supporting the wind-wheel. Fig. 4 is a detail, being a side elevation of the bracket for supporting the rudder. Fig. 5 is an enlarged detail, being a horizontal section at line 5 5 of Fig. 2, showing the position of the parts when the wind-wheel is full in the wind. Fig. 6 is a similar view showing the position of the parts when the wind-wheel is edgewise to the wind and the machinery is at rest, and also showing the lever which carries the rudder-gear in the position it occupies when the engine is at rest. Fig. 7 is an enlarged detail, being a perspective view of the coupling. Fig. 8 is a detail, being a top or plan view of the parts shown. Fig. 9 is a detail, being a perspective view of the box in which the tube is supported which carries the wind-wheel and rudder. Fig. 10 is a detail, being a perspective view of a box for supporting a vertical connecting-shaft and receiving the end of a horizontal transmitting-shaft. Fig. 11 is a side elevation of the rudder wind-wheel and gearing on a reduced scale. Fig. 12 is a horizontal section at line 12 12 of Fig. 11, showing the parts in working position. Fig. 13 is a similar view of the parts shown, showing the parts in the position they occupy when the wind-wheel is edgewise to the wind or the position shown in Fig. 6. Fig. 14 is a detail showing the regulating-vane. Fig. 15 is a detail, being a side elevation of the lever which supports the rudder-gear.

This invention relates to that class of wind-engines in which the wind-wheel and rudder are pivoted together to allow the wind-wheel to turn out of the wind or into the wind.

It has not been found practical heretofore to use gearing in this class of wind-engines on account of the tendency of the wind-wheel to climb or run out of the wind when the wind-wheel folds in the direction in which it runs and the resistance of the work which holds it in the wind when it folds in the opposite direction.

The objects of this invention are to construct an improved wind-engine which will overcome the above difficulty, to provide a device to keep the rudder in the rear of the mast in the direction from which the wind comes, and to improve the construction and operation of wind-engines generally, which I accomplish as illustrated in the drawings and hereinafter described.

That which I claim as new will be pointed out in the claims.

In the drawings, A represents the framework of the derrick, constructed as usual.

$a$ is a platform.

B is the upper portion of the derrick above the platform $a$, which forms the mast for supporting the wind-wheel.

$b$ is a cap on the upper end of the mast B, which is provided with gear-teeth on its periphery.

C is a hollow iron tube, which rests in a box $c$, supported in the platform $a$, and is supported at its upper end in the cap $b$ on the upper end of the mast B.

D is a bracket for supporting the rudder, which bracket is firmly secured to the tube C by set-screws.

E is a bracket for supporting the wind-wheel. The brackets D and E are made in the forms shown in Figs. 4 and 3, respectively. The lower arm of the bracket has a circular flange which sets into a circular recess in the lower arm of the bracket D, anti-friction rollers $d$ being held in the space between the two arms of the respective brackets, as shown in Fig. 1. The upper arms of the brackets D and E are pivotally connected by a pivot $e$ on a line with the tube C.

F is the shaft of the wind-wheel, which is mounted in a box $f$ on the bracket E.

G represents the wind-wheel, the sails of the wheel being omitted in some of the figures.

H is the staff of the regulating-vane, which is secured to the bracket E.

H' is the regulating-vane, which is adjustably secured to the staff H by bolts or other suitable means. This vane is shown in Fig. 14, but is omitted in the other figures.

I is the staff of the rudder, which is provided with lateral guys $i$, the staff and the guys $i$ being pivotally connected to the bracket D, so that they can be swung vertically. The guides $i$ are not shown in Figs. 2, 5, 6, and 11, because it is not necessary to there show them, and they would confuse the views somewhat.

J is a supporting-rod pivotally connected at its outer end to the rudder-staff I.

K is an arm formed with or secured to the outer edge of the upper arm of the bracket E, which arm is provided with adjusting-holes $k$, to which the rod J is pivotally connected by the pin $j$, which can be placed in any one of the adjusting-holes, so that the leverage of the weight of the rudder can be adjusted to hold the wheel G in the wind with greater or less force, as desired, as shown in Fig. 8.

L is a chain or cable which is attached to the regulating-vane staff H, passes around a pulley $l$ on the rudder-staff I, between two pulleys $l'$ and $g$, over a pulley $h$, which is supported in a bracket over the center of the hollow tube C, and passes thence down through the tube C and the vertical tube therein.

M is an auxiliary shaft, which is mounted in a box $n$ on the bracket D at an angle to the rudder-staff I.

$m$ is a bevel gear-wheel secured to the shaft M.

N is a universal joint, which connects the wind-wheel shaft F with the auxiliary shaft M.

O is a hollow vertical tube which forms the transmitting-shaft, supported in the tube C. This shaft O is provided with a bevel gear-wheel $o$, which meshes with the wheel $m$ on the shaft M.

P is a wind-wheel mounted on the rudder-staff I, which wheel forms the rudder-vane.

Q is a connecting-rod, which is provided at its outer end with a bevel-gear which meshes with a bevel-gear on the shaft of the wind-wheel P, and at its inner end is connected with a universal coupling $q$, which connects the rod Q with a second rod or shaft Q', which is provided with a worm-gear $q'$, adapted to engage with the gear-teeth on the cap $b$ on the mast B.

R is a lever, which is pivoted in a bracket $d'$ on the rudder-supporting bracket D, and is provided with a bearing $r$ below the pivot in which the shaft Q' is mounted, and has a horizontal arm on which a weight $r'$ is placed to hold the worm-gear $q'$ in mesh with the cap $b$. The upper arm of the lever R is provided with a pulley $l'$, around which the chain L runs and which is held at a short distance from the bracket D by the weight $r'$.

S is a second vertical shaft, which is rotated by the shaft O through the gear-wheels $p\ p'$.

S' is a shaft for communicating power for pumping purposes.

$S^2$ is a second shaft for communicating power for various purposes.

T is a box, in which the shaft S and the shaft $S^2$ are supported.

T' is a drum, which is supported in the derrick A, on which drum the chain L can be wound. This drum T' is provided with a ratchet-wheel $t$, which can be engaged by a pawl $t'$ to prevent unwinding.

The box $c$, which supports the tube C, is provided with an outer annular flange $u$ and an inner annular flange $v$, between which flanges $u$ and $v$ the tube C is supported, as shown in Figs. 2 and 9. The interior diameter of the flange $v$ is sufficient to permit the shaft O to pass through it, it forming in effect a bearing for the shaft O. The flanges $u$ and $v$ hold the tube in place and prevent the oil from escaping.

In use, when the wind-wheel G is full in the wind, as shown in Figs. 5, 8, and 11, the shaft F of the wind-wheel and the rudder-staff I are in line, the shaft M is at an angle of about forty-five degrees to that line, and the regulating-vane staff H is approximately at right angles to that line. When the staff of the regulating-vane is drawn toward the rudder-staff by the chain L or is folded by the wind, the outer end of the rudder is raised, because the rod J, which supports the rudder from above, is pivoted at a short distance from the pivot $e$, on which the wind-wheel turns or swings when folded laterally, as shown in Figs. 1, 2, 8, and 11. The weight of the rudder is thus exerted to keep the shaft F in the bracket E in line with the rudder-staff I and the wind-wheel at right angles to the wind or full in the wind. By putting the pivot $j$ in a hole $k$ in the plate K at a greater or less distance from the pivot $e$ the weight of the rudder will have a greater or less leverage on the bracket E and will hold the wheel G in the wind with greater or less force. When the wind-wheel is set and held by the chain L at a proper angle to the rudder to do the required work, the resistance of the work is overcome by the wind-wheel G, the wind-wheel G having a tendency to climb or run out of the wind, which is overcome by the rudder. When the force of the wind increases or the resistance of the work decreases, the regulating-vane will be swung automatically toward the rudder, carrying the wind-wheel G out of the wind until the resistance of the wind on the rudder balances the force of the wind on the regulating-vane, so that the weight of the rudder will be automatically exerted to regulate the wind-wheel G within the angle at which it is set by the chain L.

The movements of the wind-wheel G into and out of the wind to automatically regulate the wind-wheel, according to the force of the wind and the resistance of the work, are not affected by the gearing, because the wind-wheel shaft F is connected to the shaft M, which transmits the power to the vertical shaft O by a joint which permits the wind-wheel to swing or fold into or out of the wind without the tendency of the gearing to climb or the resistance of the work preventing its free movements, thereby permitting the wind-wheel to automatically regulate itself in very slight changes in the work or wind.

The rudder-staff I is pivoted to the bracket D, which carries the auxiliary shaft M, so that the staff can swing in a vertical plane and the weight of the staff be employed to hold the bracket E and the wind-wheel shaft F substantially in line.

I have shown a common universal joint connecting the shafts F and M; but it is evident that any common form of coupling or gearing can be used which will communicate the rotary motion from the wind-wheel shaft to the auxiliary shaft M without being affected by the swinging of the shafts F and M in relation to each other.

The shaft M is set at an angle to the rudder-staff I, as shown in Figs. 5 and 6, to permit the wind-wheel to fold from full in the wind to entirely out of the wind, an angle of ninety degrees, without cramping the joint, and to allow the shafts to be nearly in line when the major part of the work is being done.

The rudder wind-wheel P is rotated by the wind whenever the wind changes so as to blow on either side of the wheel, and it remains stationary when it is in the rear of the tube C in the direction from which the wind blows. When the wind changes and blows on one side, as indicated by arrows in Fig. 12, the wheel P is rotated in the direction indicated by the arrow in Fig. 11, and the rudder-staff I and bracket D are turned by the engagement of the worm-gear $q'$ on the connecting-rod Q' with the geared cap $b$ on the mast B until the rudder is directly in the rear of the mast C. When the wind changes in the opposite direction and blows on the opposite side of the wind-wheel P, the wind-wheel P will rotate in the opposite direction and turn the rudder in the rear of the mast, as before.

The engagement of the worm-gear $q'$ with the cap $b$ holds the rudder stationary while the rudder is in the rear of the mast in the direction from which the wind blows.

A universal coupling $q$ is provided between the rods Q Q' to permit the rod Q to be swung vertically with the staff I when the wind-wheel G folds on the rudder, the shaft Q' having a longitudinal movement to permit such swinging of the rod Q.

When the wind-wheel G is in the wind, the chain L is slack, so that the weight $r'$ on the horizontal arm of the lever R holds the gear $q'$ in mesh with the geared cap $b$ and will hold it there as long as the chain L is not tightened, as shown in Figs. 5 and 11; but when the wind-wheel G is drawn out of the wind by the chain L, as shown in Figs. 6 and 12, the chain L is tightened, which draws the pulley $l'$ and the vertical arm of the lever R toward the bracket D and throws the worm-gear $q'$ out of mesh with the geared cap $b$, so that the rudder is free to swing in the wind. Thus the rudder is firmly held in the rear of the mast in the direction from which the wind blows and is automatically shifted to that position when the wind shifts while the wind-wheel is at work; but when the wind-wheel G is drawn out of the wind and is not at work the rudder is free to swing in the wind and to move instantly with the variations in the wind.

The wind-wheel P, when the gear $q'$ is out of mesh with the cap $b$, acts as a simple rudder-vane, and may at times be employed as such when the wind-wheel is at work; but when the gear is in mesh it acts to keep the wind-wheel G firmly in the wind, and thus secure the full working power of the engine.

What I claim as new, and desire to secure by Letters Patent, is—

1. In a wind-engine, the combination, with a wind-wheel shaft and its supporting-bracket, of a second bracket on which said wind-wheel bracket is pivoted, an auxiliary shaft on said second bracket, a device for communicating rotary motion from the wind-wheel shaft to the auxiliary shaft, a bevel gear-wheel $m$ on said auxiliary shaft, a vertical shaft O, provided with a bevel gear-wheel $o$, and a rudder-staff secured to said second bracket, substantially as specified.

2. In a wind-engine, the combination, with a wind-wheel shaft and its supporting-bracket, of a second bracket on which said wind-wheel bracket is pivoted, an auxiliary shaft on said second bracket, a device for communicating rotary motion from the wind-wheel shaft to the auxiliary shaft, a bevel gear-wheel $m$ on said auxiliary shaft, a vertical shaft O, provided with a bevel gear-wheel $o$, a rudder-staff pivoted to said second bracket to swing in a vertical plane, and a supporting-rod J, connected to said rudder-staff and to said wind-wheel bracket, substantially as specified.

3. In a wind-engine, the combination, with a wind-wheel shaft and its supporting-bracket, of a second bracket on which said wind-wheel bracket is pivoted, an auxiliary shaft on said second bracket, a device for communicating rotary motion from the wind-wheel shaft to the auxiliary shaft, a bevel gear-wheel $m$ on said auxiliary shaft, a vertical shaft O, provided with a bevel gear-wheel $o$, a rudder-staff secured to said second bracket, and a geared cap and a worm for holding the rudder in rear of the mast, substantially as specified.

4. In a wind-engine, the combination, with a wind-wheel shaft and its supporting-bracket, of a second bracket on which said wind-wheel bracket is pivoted, an auxiliary shaft on said second bracket, a device for communicating rotary motion from the wind-wheel shaft to the auxiliary shaft, a bevel gear-wheel $m$ on said auxiliary shaft, a vertical shaft O, provided with a bevel gear-wheel o, a rudder-staff secured to said second bracket, a rudder wind-wheel supported on said staff, a derrick having a geared cap, and gearing between said rudder wind-wheel and said cap, substantially as specified.

5. In a wind-engine, the combination, with a wind-wheel shaft and its supporting-bracket, of a second bracket to which said wind-wheel bracket is pivoted, an auxiliary shaft on said second bracket, a device for communicating rotary motion from the wind-wheel shaft to the auxiliary shaft, a bevel gear-wheel m on said auxiliary shaft, a vertical shaft O, provided with a bevel gear-wheel o, a rudder-staff pivoted to said second bracket to swing in a vertical plane, a rudder wind-wheel supported on said rudder-staff, a rod J, connected to said rudder-staff and said wind-wheel bracket, a derrick having a geared cap, a worm adapted to engage with said geared cap, a connecting-rod Q, gearing for rotating said rod Q from the rudder wind-wheel, and a universal coupling q, substantially as specified.

6. In a wind-engine, a tube C and bracket D, secured thereto and carrying a rudder, in combination with a bracket E, pivoted to the bracket D by a pivot e at its upper arm and pivotally supported at its lower arm on the lower arm of the bracket D, a wind-wheel and shaft carried by said bracket E, and a rod J, pivoted to the bracket E at a short distance from the pivot e and to the rudder, substantially as specified.

7. In a wind-engine, a mast B, tube C, bracket D, carrying the rudder and an auxiliary shaft M, bracket E, pivoted on said bracket D, shaft F on said bracket E, and universal coupling N, in combination with a shaft O and bevel-wheels m, substantially as specified.

8. In a wind-engine, a mast having a cap b, provided with gear-teeth, in combination with a rudder-staff pivotally supported on said mast, a rudder wind-wheel, a worm-gear $q'$, meshing with said cap b, and a connecting-rod for communicating motion from the rudder-wheel to the worm-gear and having a universal coupling q, substantially as specified.

9. In a wind-engine, a mast having a cap b, provided with gear-teeth, a rudder staff and its support, and a rudder wind-wheel, in combination with a connecting-rod having a gearing $q'$, a lever R, which supports the rod, and a chain L, adapted to throw the gear $q'$ in or out of gear with the cap b, substantially as specified.

10. In a wind-engine, a mast B, having a cap b, provided with gear-teeth, in combination with a rudder-staff pivotally mounted therein and adapted to swing vertically in its support, a rudder-vane, a connecting-rod Q, universal coupling q, shaft F, and gearing $q'$, substantially as and for the purpose specified.

11. In a wind-engine, a rudder wind-wheel and mechanism for turning the rudder in rear of the mast by the rotation of the rudder wind-wheel, in combination with a chain L, a lever, and mechanism for throwing the turning-gear out of mesh, substantially as and for the purpose specified.

12. In a wind-engine, a mast B, cap b, having gear-teeth, rudder-staff I, wind-wheel P, and connecting-rod Q, having gearing $q'$, in combination with the lever R, supporting said rod Q, weight $r'$, pulley $l'$, and pull-chain L, substantially as and for the purpose specified.

MARK C. CHAPMAN.

Witnesses:
FRANK A. TYLER,
GEO. DUNTON,
F. R. JONES.